United States Patent Office 3,488,217
Patented Jan. 6, 1970

3,488,217
PROCESS FOR IMPARTING A SOFT FEEL TO TEXTILE FIBER AND THE RESULTING FIBER
James Francis Ryan, Jr., deceased, late of Staunton, Va., by The First and Merchants National Bank, adminstrator, Staunton, Va., assignor to E. I. du Pont de Nemours and Company, Wilmington, Del., a corporation of Delaware
No Drawing. Continuation-in-part of application Ser. No. 603,684, Dec. 21, 1966, which is a continuation-in-part of application Ser. No. 313,160, Oct. 2, 1963. This application Feb. 29, 1968, Ser. No. 709,495
Int. Cl. B44d 1/22, 5/00; D06m 15/66
U.S. Cl. 117—138.8  26 Claims

ABSTRACT OF THE DISCLOSURE

A process for finishing textile fibers with a combined polyepoxide-silicone resin mixture in a ratio of about 0.05:1 to 1:1 by weight where the polyepoxide has a molecular weight of no more than 5,000 and the silicone has a molecular weight of from 500 to 100,000. The invention also includes a fiber with the cured polyepoxide-silicone finish.

RELATED APPLICATIONS

This application is a continuation in-part of U.S. application Ser. No. 603,684, filed Dec. 21, 1966, which is a continuation-in-part of U.S. application Serial No. 313,160, filed Oct. 2, 1963 (both now abandoned).

BACKGROUND OF THE INVENTION

Field of the invention

This invention relates to finishing man-made and natural fibers. It is particularly concerned with finishing synthetic fibers to render them permanently soft and slick so that they may resemble the more aesthetic animal fibers such as cashmere.

Discussion of the prior art

It has heretofore been impossible to produce synthetic fibers with the durable, soft, slick handle of cashmere. Some temporary finishes have been used to impart the cashmere feel to fibers but these finishes are removed by washing. Thus, condensation products of long chain fatty acids, acid chlorides, or acid anhydrides with alkanolamines yield finishing compositions which impart a soft, slick hand to fibers, but which are not fast to washing.

Somewhat more durable and otherwise satisfactory finishes are the silicones. These are made by hydrolysis of various mixtures of mono-, di-, and tri-alkyl chlorosilanes followed by condensation in which water is split out from two or more different molecules. The resulting polymers impart a pleasant, slick feel to synthetic fibers. If the silicone is made from an alkyl hydrogenchlorosilane so that the polymer will contain some hydrogen groups bound directly to silicon, then the finish will be somewhat durable because cross-linking will occur as the silicon hydrogen groups are hydrolyzed to silanol and these condense to form interchain bridges. But even these silicones will not resist repeated scouring.

SUMMARY OF THE INVENTION

The present invention imparts a durable soft, slick handle to textile fibers by coating them with a finishing composition comprising a silicone resin and a soluble polyepoxide and thereafter curing the finish on the fiber. The silicones are liquid silicones whose molecules are made up of silicon atoms joined by one oxygen atom between each pair of neighboring silicon atoms. The sum of H and OH groups bonded to silicon on every silicone molecule is at least two. The said silicones contain on average between 5 and 60 silyl hydrogen atoms for each 100 silicon atoms, with the rest, if any, of each of the four valences of each silicon atom bonded to a group selected from the class consisting of an alkyl radical containing from 1 to 8 carbon atoms and an aryl radical containing from 6 to 8 carbon atoms. The silicones have a molecular weight of no less than 500. The ratio of the polyepoxide to silicone is about 0.05:1 to about 1:1 by weight. The fibers can be dried prior to curing. A catalyst and/or heat can be used to speed curing.

GENERAL DESCRIPTION

It has been found that the pleasant, slick finishing effects of the silicones can be made highly durable by combining silicones with polyepoxides. It is believed that the polyepoxides cross-link with the silicone resins during curing, thereby fixing them on the fibers. The polyepoxides also cause the silicones to spread uniformly over the surface of the fiber.

Although the silicones are capable of cross-linking by themselves, highly cross-linked silicone products are not elastic and have poor adhesion to the fiber. Also, the highly cross-linking product is brittle and has poor durability due to flaking off from the fibers. A partially cured silicone product is less brittle, but is insufficiently durable. The cured combination of silicone and polyepoxide of this invention yields a product which is flexible, somewhat elastic and which has good adhesive properties. Furthermore, the combination of polyepoxide and silicone imparts an unusually slick hand.

In general, the silicones desirable for the purposes of this invention are those made from mono-, di-, and trichlorosilanes which bear substituents of the group consisting of an alkyl of 1 to 8 carbon atoms, an aryl of 6 to 8 carbon atoms, or mixtures of such silanes. Preferably, at least one of the substituents is methyl or ethyl. In all cases, the silanes employed initially should consist predominantly of dichlorosilanes; monochlorosilanes are desirable in minor quantities, to act as chain stoppers; trichlorosilanes have a cross-linking effect and may be present in only minor proportions. Instead of chlorosilanes one may use alkoxy silanes such as dialkyl dialkoxysilanes.

Typical reactions for the preparation of these silicones are as follows:

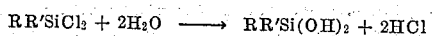

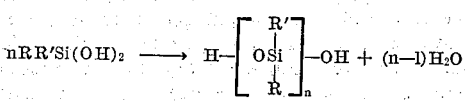

wherein R and R' may be hydrogen or any of the alkyl or aryl groups discussed above. The value of $n$ is such that the molecular weight of the polymer is no less than 500, preferably under 100,000, and more preferably from 1,000 to 50,000.

The molecular weight can be controlled by including in the reactants a small amount of mono-functional chain stopper such as trialkyl chlorosilane. If an alkyl hydrogen dichlorosilane is used, the structural unit will contain one alkyl group and one hydrogen on the silicon. These units are capable of cross-linking by hydrolysis or oxidation and condensation.

Low molecular weight ring compounds are also formed by these reactions. In larger molecules, the condensations usually do not go to completion unless the products are heated for long periods. Usually there will be some free hydroxyl groups on the polymer. Catalysts such as iodine, strong acids or alkalis will hasten the silicone condensation reaction.

The condensation reactions leading to silicone resins with various chain lengths and various degrees of branching and cross-linking make possible the preparation of a large number of silicones.

The silicones which are preferred for this invention are liquids which are copolymers or mixtures of polymers containing methylhydrogen siloxane and dimethyl siloxane units corresponding on average to the empirical formula

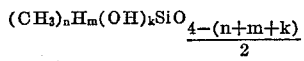

where $n$ has a value from 1.4 to 2.0, $m$ has a value from 0.05 to 0.60, and the sum of $n$ plus $m$ plus $k$ is a number from 1.9 to 2.1. All ranges are inclusive of the outer limits. The $CH_3$, H, OH and O groups are each, if present, bonded to silicon; the sum of the H and OH groups on every silicone molecule is at least two. Liquids of this type may be produced by the hydrolysis and condensation of $CH_3HSiCl_2$ in admixture with other chlorosilanes such as $(CH_3)_3SiCl$, $(CH_3)_2HSiCl$ and $(CH_3)_2SiCl_2$, or by mixing polymer of $CH_3HSiCl_2$ with polymers of $(CH_3)_2SiCl_2$ each polymer chain being terminated with hydroxyl groups or chain stoppers.

Many of the suitable silicones are available on the market under various trade names, such as "Syl-Mer," "Syl-Soft," "LE–48," "L–31" (methyl hydrogen silicone) and "Decetex" 104.

The polyepoxides useful in this invention are conveniently made by reacting epichlorhydrin with a polyhydroxy compound. One of the preferred polyhydroxy compounds is glycerol. The preparation of polyepoxides from epichlorhydrin and glycerol is described in U.S. 2,872,428.

Other suitable polyhydroxy compounds include: bisphenol A, i.e., 2,2-bis(4-hydroxy phenyl)propane; 4,4′-dihydroxy diphenyl ether; 4,4′-dihydroxy benzophenone; ethylene glycol; diethylene glycol; and propylene glycols. Polyethylene oxide derivatives made by reacting ethylene oxide with polyhydroxy compounds are also suitable for reacting with epichlorhydrin. Thus, glycerol, ethylene glycol and the polyhydroxy aromatic derivatives listed above may first be reacted with from one to twenty moles of ethylene oxide before reacting with epichlorhydrin. Further details of the preparation of polyepoxides are given in U.S. Patent 2,913,356.

When epichlorhydrin reacts with a hydroxy group it forms an ether. But the epoxy group can react either with a hydroxy group or with another epoxy group so that the resulting products are not simple epoxy ethers but polymers. For the purposes of this invention, it is preferable to have low molecular weight polymers or the simple polyepoxy compounds. Polyepoxides with molecular weights of not over 5000 are acceptable, but products in the range up to 1000 are preferred. In most cases, the products used are mixtures of various molecular weights and may contain, and preferably do contain, monomeric compounds having two or more epoxide groups. Diglycidyl ether itself may be used.

The finishing composition can be applied or coated upon the fiber in any feasible manner. The composition can be dispersed in water or dissolved or dispersed in an organic carrier such as methylene chloride; under normal conditions the latter is uneconomical. If an aqueous dispersion is utilized, it is desirable that the polyepoxide be water soluble or easily water dispersible for convenience of use.

It is best that the silicone and the polyepoxide be mixed only a short time before using. The silicone can be dispersed in water by means of anionic, cationic or nonionic surface active agents. Suitable cation active agents are stearyldimethylbenzyl ammonium chloride and cetyltrimethyl ammonium chloride. The long chain alcohol sulfates either alone or mixed with reaction products of long chain alcohols and up to 20 moles ethylene oxide can also be used for emulsifying the silicones. After the silicones are dispersed, the polyepoxide is added and the resulting composition is applied to the fibers, preferably at room temperature, inasmuch as heating tends to cause premature cross-linking and precipitation of the polymers.

The ratio of polyepoxide to silicone can vary from about 0.05:1 to about 1:1 by weight, but a ratio of about 0.15:1 is preferred.

The dispersion of silicone and polyepoxide in water at a concentration of from 2 to 25% silicone is applied to fiber, the latter being preferably in the form of crimped rope or tow, but the dispersion can also be applied to staple fiber. About 0.1 to 3.0% silicone on a fiber will give the optimum effect, with 1.5 to 2.0% usually preferred; however, the lower limits are particularly effective with polyester fibers.

The finishing composition can be coated on the fiber at any feasible operating temperature at which the composition and its components remain liquid. However, the application temperature must not be high enough to cause premature curing of the composition. By liquid is meant a substance that flows as opposed to a solid or gaseous material, i.e., a material characterized by free movement of the constituent molecules among themselves, but without the tendency to separate which is characteristic of gases. Normal application temperatures are near room temperature.

A catalyst can be used to speed curing of the finishing composition. Among the catalysts which can be used are zinc, tin and lead salts of organic acids containing one carboxyl group and from 2 to 20 carbon atoms per molecule. The zinc and lead salts of 2 to 10 carbon atom acids are preferred, e.g., lead 2-ethyl hexanoate and zinc 2-ethyl hexanoate. A primary, secondary or tertiary amine salt of a volatile weak acid, e.g., acetic, formic or carbonic acid, can also be used. An example of a catalyst of the latter group is a phenol of the formula

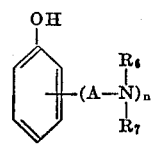

where A is —$CH_2$— or —$CH_2CH_2$—, R is —$CH_3$ or —$C_2H_5$ and $n$ is a number from 1 to 3, inclusive, combined with a volatile, weak acid. A preferred catalyst is 2,4,6-tris(dimethylaminomethyl) phenol acetate. Another catalyst is imino-bis-propylamine acetate.

About 1.0% to 15.0% of catalyst should be used, based on the weight of the silicone. The amount of amine used can be about half of that used for metal salts of the carboxylic acids. It is believed that certain catalysts such as the metal salts cause further polymerization of the silicones which in turn are ultimately cured with the polyepoxides. Similarly the amines are believed to cause further polymerization of both the polyepoxides and silicones. A preferred catalyst would be a mixture of the metal salts and primary, secondary or tertiary amines.

The treated tow or rope can conveniently be cut into staple after coating and before drying. The staple can then be dried, if necessary, and heated to cure the finishing composition. The fibers are preferably heated from 5 to 15 minutes at temperatures in the range of 120° C. to 170° C., although maximum curing temperature is slightly below the fiber softening point. The heating cures the resins on the fiber and gives a durable, soft, slick finish which will withstand scouring and dyeing operations and persist during the repeated wearing and washing of garments made from the fibers.

It has been found that best results are obtained if the tow to be treated is free of oily finishes. The fiber normally has a finish before crimping to lubricate it and prevent excessive damage in the crimper. A satisfactory non-oily finish is a water solution of stearlydimethylbenzyl ammonium chloride or of the sodium salt of the sulfate ester of a condensation product of ethylene oxide with a mixture of saturated and unsaturated alkanols of 16 to 18 carbon atoms. About 0.05 to 0.15% of the said ammonium chloride or the said sulfate, based on the dry weight of the fiber, is satisfactory. After crimping, the silicone-epoxide emulsion can be applied without removing the crimp finish.

Fibers finished by the process of this invention yield fabrics which have less tendency to form pills on the surface. A variety of fibers may be utilized with the polyepoxide-polysilicone finishes. These include acrylonitrile fibers which are preferred as well as nylon, polyester, wool, glass, rayon and cotton.

The fabrics also do not glaze as badly as do fabrics from untreated fibers. Glazing is a condition where fibers are flattened and shaped into a plane surface so that the fabrics have a "shine." It is caused by hot pressing which fixes the fibers in place; they become slightly adherent to each other. It is believed that the silicones and the silicone-epoxide finishes decrease glazing by acting as release agents, keeping the fibers from sticking together and from being fixed in a plane surface.

This freedom of motion is also believed responsible for the improved wrinkle resistance imparted by these agents to the fabric, which is as much as 15% higher than in an untreated sample.

The silicones themselves produce these same benefits, but only temporarily. The effects are largely lost after one or two scourings or dry cleanings.

EXAMPLES

Without limiting this invention, illustrative details of the treatment of fibers with a combination of silicone and epoxy resins are given in the following examples. The silicone retention percentage is measured by determining the silicon content in the respective fiber or fabric. This is done by fusing the sample of fiber or fabric with potassium carbonate and forming with ammonium molybdate the yellow silicomolybdate. The solution is then reduced with aminonaphthol sulfonic acid to yield molybdenum blue which is measured colorimetrically. Alternately, one may grind the fiber, press the resulting powder into a pellet and measure the silicone content by X-ray fluorescence.

Further details of the analytical method can be obtained from A. B. Carlson and C. V. Banks "Spectrophotometric Determination of Silicon," Analytical Chemistry, volume 24, p. 472 (1952), and from S. Sun, "Fluorescent X-ray Spectrometric Estimation of Aluminum, Silicon and Iron in the Flotation Products of Clays and Bauxites," Analytical Chemistry, volume 31, page 1322 (1959).

EXAMPLE 1

Ten parts of a commercial, 100%, polyepoxide were added to 257 parts of water and stirred until solution was complete except for slight cloudiness. Then 133 parts of a commercial, 30%, silicone resin (in aqueous dispersion) were added with stirring.

This emulsion was applied to 470,000 denier (52,222 Tex) crimped tow of 4-denier per filament fiber spun from a terpolymer of the following composition:

| | Parts |
|---|---|
| Acrylonitrile | 93.6 |
| Methyl acrylate | 6.0 |
| Sodium styrenesulfonate | 0.4 |

The amount of emulsion applied to the yarn was approximately 1 part emulsion to 10 parts of fiber (calculated to leave 1% silicone and 0.25% epoxide on the fiber). The wet tow was cut into 2-inch staple. This was dried and heated at 140° C. for 15 minutes. Some of this staple was spun into a 20/2 cc. yarn and this was made into a knit tubing. The tubing had a pleasant, slick, smooth feel.

The coefficient of friction of the treated fiber was determined by the method of Roder (Journal of the Textile Institute, pages T–247 to T–251; June 1953), at speeds of 0.003, 0.02, 0.1, 0.6 and 3.0 cms./sec. A control fiber of the same type but with the conventional oil finish was similarly tested. The results were as follows:

| | Coefficients of friction | | | | |
|---|---|---|---|---|---|
| Speed, cm./sec | 0.003 | 0.02 | 0.1 | 0.6 | 3.0 |
| Control fiber | 0.29 | 0.28 | 0.24 | 0.21 | 0.20 |
| Fiber treated with silicone plus polyepoxide | 0.12 | 0.12 | 0.13 | 0.13 | 0.14 |
| Fiber treated with silicone alone | 0.12 | 0.12 | 0.13 | 0.13 | 0.14 |

It will be noted that the combination of the epoxide resin was silicone did not cause any increase in the coefficient of friction over the value for silicone alone. But the combination finish was more resistant to removal by scouring as shown below, where the percent silicone retained after a dyeing operation (which includes scouring) is shown for the two finishes:

Finish: Silicone retained, percent
    Silicone alone _____ 62
    Silicone plus polyepoxide _____ 94

The glaze resistance of these finishes was determined by placing a yarn of treated fiber upon a fabric made from treated fiber and pressing at 200° C. at a pressure of 5 p.s.i., then measuring the force necessary to pull the yarn away from the fabric. The results were as follows:

Fiber: Release load (milligrams)
    Untreated _____ 770
    Treated with silicone+epoxide _____ 180
    Silicone only _____ 170

It will be noted that the combination finish is essentially equal to the silicone alone in glaze resistance.

EXAMPLE 2

A number of commercial silicones of various trade names were applied to tows of fibers spun from the acrylonitrile/methylacrylate/sodium styrene sulfonate terpolymer described in Example 1. Combinations of the same silicones with commercial epoxides were likewise applied. In these combinations, the weight-ratio of epoxide to silicone was varied from 1/10 to 1/2.

The tows were then cut into staple and converted to knit fabrics. The resistance to removal by washing and by dry cleaning was then determined for each treatment. Also the soft-slick tactility was estimated by a panel trained in this evaluation. The evaluation is based on subjective judgment as to slickness and smoothness of the fabric, and a rating of "5" means excellent, while "1" stands for poor.

Zinc 2-ethyl hexanoate, in quantities of 1.5% to 5.0% by weight, was also added to some of the silicones and some of the silicone-polyepoxide combinations, to serve as a catalyst.

It was found that the samples treated with combinations of epoxide and silicone in ratios of 1:10 to 1:4 all earned a rating of 5 in the soft-slick tactility judgment, which was also the rating earned by the samples treated with silicone alone. The retention of silicone after scouring and dyeing was in the range of 70 to 95% for all samples which had been treated with silicone-epoxide combination, while for those treated with silicone alone it was in the range of 50 to 62% by weight. In the former case, the retention of silicone was also high in dry cleaning.

The silicones employed in the above tests were those now available in commerce under the trade names "Syl-Mer" 72, "Syl-Soft" 14, "De Cetex" 104 and "ET–4–0024." For polyepoxide, a commercial product bearing the trade name "Eponite" 100 was employed.

EXAMPLE 3

A silicone was prepared by hydrolyzing a mixture consisting of 10 parts dimethyl dichlorosilane, 10 parts methyl hydrogen dichlorosilane, one part trimethyl chlorosilane and one part dimethyl hydrogen chlorosilane. The hydrolysis was carried out by adding 5% excess (over theory) of water, dissolved in dioxane with stirring. After the initial reaction, a dilute aqueous solution of HCl was added with stirring. When stirring was stopped, the silicone fluid layer floated to the top. The aqueous bottom layer was drained off, and the silicone was washed with cold water, then with a sodium bicarbonate solution, and then again with water.

Twenty parts of this silicone were mixed with 2 parts of sodium oleyl sulfate, 1 part hexadecanol and 4 parts of water. The mass was stirred to a paste, and 173 parts more of water were added. This resulted in a dispersion of the silicone at a concentration of 10%.

To 100 parts of the above emulsion were added 2.5 parts of a polyepoxide made from glycerol and epichlorhydrin and having a structure of the formula

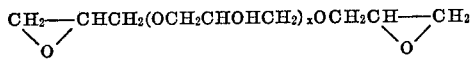

wherein $x = 1$ to 3. With stirring, this product dispersed into the silicone emulsion. (The emulsion should not be heated.)

A tow of 470,000 denier was spun from a terpolymer of the same composition as in Example 1.

After washing and drawing, the wet tow was finished by treating with 2.0% solution of the sodium salt of the sulfate ester of a condensation product of 16 moles of ethylene oxide with a mixture of saturated and unsaturated alkanols of 16 to 18 carbon atoms.

This tow was then passed through a stuffer-box crimper, and then through an applicator where one part of the silicone-epoxide emulsion was applied to 10 parts of tow (on the basis of dry tow).

The tow was then cut into staple and dried on a screen belt at 150° C. for 15 minutes. This cured the silicone-epoxide resin to give a soft, slick finish which was durable to washing.

Another tow was similarly treated with the same silicone, but without the polyepoxide.

Staple fiber from each treatment was spun into 20/1 cc. yarns and, after two plying, these yarns were knit into jersey fabrics in the form of tubing. The fabrics were scoured at the boil for 2 hours. After rinsing and drying, the percent silicone retained was determined. The results were as follows:

| Finish: | Percent silicone retained |
|---|---|
| Silicone only | 62 |
| Silicone + polyepoxide | 95 |

EXAMPLE 4

A series of silicones was prepared by the general methods described in U.S. 2,486,162 and 2,588,366. The proportions of the reactants used are shown in the following table:

| Silicone: | Methyl hydrogen dichloro silane, parts | Dimethyl dichloro silane, parts | Trimethyl chloro silane, parts | Silicone obtained, parts |
|---|---|---|---|---|
| A | 100 | 0 | 5.1 | 47 |
| B | 75 | 28.1 | 5.1 | 49 |
| C | 50 | 56.2 | 5.1 | 53 |
| D | 25 | 85.0 | 5.1 | 56 |
| E | 10 | 100.5 | 5.1 | 57 |
| F | 5 | 107.0 | 5.1 | 58 |

The procedure used was as follows: The chlorosilanes indicated in the above table were mixed with 75 parts of dry benzene and cooled to 20° C. To the mixture, 67.5 parts of isopropyl alcohol were added over a period of 10 minutes, and then 78 parts of water were added over a period of 1 hour to effect hydrolysis. An additional 75 parts of benzene were then added to the reaction mixture. The product was washed with successive portions of water to remove acid hydrolysis products, and then the mixture was strip distilled at 3 mm. pressure to 125° C., to remove benzene and low boiling products.

Emulsions of the silicone oils were prepared by vigorously stirring a mixture of 10 parts of the silicone oil with 100 parts of water containing 0.1 part of an emulsifying agent (the sodium salt of the sulfate ester mentioned in Example 3). The emulsions were further diluted with 900 parts of water, and 2.5 parts of a polyepoxide, of the same structure as in Example 3, were added.

With stirring, this product is dispersed into the silicone emulsion.

Staple of about 3 denier per filament was prepared from a terpolymer of the same composition as in Example 1.

Samples of the staple were dipped in the various silicone-epoxide emulsions obtained above, and squeezed to give about 100% wet pick up. They were then dried at 130° C. for 15 minutes to cure the silicone-epoxide resin coating to give a soft, slick, durable finish.

Other lots of staple were treated with the silicone-epoxide emulsions of the same series but which contained further 3.3 parts of zinc 2-ethyl-hexanoate. Additional lots of staple were treated with emulsions of the above silicones, containing 3.3 parts of zinc-ethyl-hexanoate but no epoxide resin.

The treated staples were then converted into knit or woven fabrics and the resistance to dyeing, washing and dry cleaning was determined for each treated sample. The soft-slick tactility (sometimes referred to as aesthetic rating) of the fabrics was also determined by subjective judgment as above described.

The results of the various tests and ratings were as follows: Silicones A, B and C, whether used by themselves or in conjunction with a polyepoxide or a catalyst or both, gave aesthetic ratings of 4 to 5 (mostly 5). Silicones D, E and F under the same variations, gave ratings of 3 and 4 (mostly 3).

The percentage silicone retained after dyeing, followed by 5 washings (with detergent) in a home-type washing machine at a temperature of 40° C., was highest for the fabrics prepared from staples which had been treated with an emulsion containing silicone, polyepoxide and catalyst (92 to 95 in the cases of silicones A, B and C; 32 to 56 in the cases of D, E and F). The retentions for those fabrics whose staple had been treated with silicone and polyepoxide alone (no catalyst) were lower (45 to 68 for A, B and C; 27 to 35 for D, E and F), and were not much different from those obtained when the treatment had been with silicone and catalyst alone.

The silicone retention after dyeing and subjecting to 5 dry cleanings followed essentially the same pattern.

The general conclusions from the above series of tests and data are that (a) the silicone-epoxide finishes appear to be equal to the silicone finishes in aesthetic rating before washing or dry cleaning and superior thereto after these operations;

(b) the silicone-epoxide-catalyst emulsions lead to finishes of highest durability to washing and dry cleaning, and are superior in that respect to silicone-epoxide emulsions without catalyst and to silicone-catalyst emulsions without polyepoxide.

EXAMPLE 5

Two silicones were prepared by the general methods described in U.S. Patent 2,486,162 and 2,588,366. One was prepared from methyl hydrogen dichlorosilane and was a trimethylsiloxy end-blocked methylhydrogenpolysiloxane. The other was prepared from dimethyldichlorosilane and was hydroxy ended dimethylpolysiloxane with viscosity of about 8000 centistokes.

A mixture of these two silicones was prepared to have 20 parts of methylhydrogen-polysiloxane and 80 parts of dimethylpolysiloxane. This mixture of silicones was dissolved in about 100 parts of methylene chloride and this solution poured into a solution of 3 parts of stearylbenzyldimethylammonium chloride in 225 parts of water while subjected to high speed, high shear stirring. Stirring was continued until the temperature of the mixture reached 50° C. (from friction). At this point most of the methylene chloride had been evaporated from the mixture and a good emulsion containing silicone droplets no larger than 5 microns in diameter was obtained.

To this emulsion was added 540 parts of water, 15 parts of a polyepoxide (described in Example 3) and 112.5 parts of a solution containing 2 percent 2,4,6-tris(dimethylaminomethyl) phenol which was adjusted to pH=5.5 using acetic acid. This mixture containing 10% silicone has been denoted Emulsion A.

A second emulsion was prepared from 10 parts of lead 2-ethylhexanoate, 1 part of stearylbenzyldimethylammonium chloride and 389 parts of water by high speed, high shear stirring. This emulsion containing 2.5% lead 2-ethylhexanoate has been called Emulsion B.

These emulsions were pumped by suitable metering pumps into a small pipe-shaped mixing zone of appropriate size to permit 20 to 30 seconds mixing time. From the mixing zone, the mixed emulsions passed through jets which impinged on a moving 470,000 denier tow of fibers spun from a copolymer of 96 parts of acrylonitrile and 4 parts of sodium styrenesulfonate. The metering pumps were adjusted to deliver 1 part of Emulsion B for each 5 parts of Emulsion A. The pumping rate for Emulsion A was adjusted to apply 20 parts to each 100 parts of the 470,000 denier tow moving past the application jets. This results in the application of 2% silicone, 0.3% polyepoxide, 0.45% 2,4,6-tris(dimethylaminomethyl) phenol and 0.1% lead 2-ethylhexanoate to the acrylic tow.

The wet tow was cut to lengths varying from 3 to 5 inches, distributed in a bed in a forced air dryer and dried for 15 minutes at 140° C. This drying also cured the surface modifier on the fibers. Any of a number of temporary antistatic finishes may then be applied to the dried staple to aid subsequent textile processing.

Portions of the surface modified staple were processed into a 20/2 cotton count yarn and this was knit into a jersey stitch fabric. The fabric was dyed and then finished by steaming flat. The knit fabric had a pleasant smooth, slick feel. When the knit fabric was made into sweaters and subjected to normal conditions of wear with periodic laundering or dry cleaning, the pleasant smooth-slick feel was retained through wear periods exceeding 200 hours.

EXAMPLE 6

This example demonstrated the application of the invention to natural fibers and to synthetic fibers other than acrylic fibers.

Five parts of Emulsion A and 1 part of Emulsion B of Example 5 were mixed and the resulting emulsion was used immediately to treat, separately, staple fibers of nylon, polyester, viscose rayon, wool and cotton. After squeezing out the excess emulion, the fibers were dried and heated in an oven at 130° C. for 30 minutes. The staple fibers were next carded and spun into 20/1 cc. yarns. The yarns were knit into tubular fabrics and evaluated for softness and slickness before and after a mock dyeing at the boil for 2 hours in a slightly acidic bath. The silicon content of the fibers before and after the mock dyeing was determined as well as the silicon content of untreated fibers before and after the dyeing. (It was found that all of the fibers had an inherent silicon content which must be considered.) These results are shown in Table 1 below. The silicon determination was made by grinding the fibers, pressing the powdered fibers into pellets and measuring silicon content by X-ray fluorescence.

The fabrics from treated fibers were slicker and softer than fabrics from untreated fibers and retained this superiority after the 2-hour boiling.

TABLE 1.—SILICONE CONTENT, PERCENT

| Fiber: | Untreated Fiber (Inherent silicone) | | Treated Fiber | |
|---|---|---|---|---|
| | Before boiling | After boiling | Before boiling | After boiling |
| Nylon | 1.1 | 0.3 | 3.4 | 3.7 |
| Polyester | 0.7 | 0.4 | 3.5 | 3.1 |
| Wool | 0.2 | 0.3 | 3.6 | 3.6 |
| Rayon | 0.8 | 0.1 | 2.7 | 2.7 |
| Cotton | 0.4 | 0.1 | 2.6 | 2.6 |

These results show that the silicone-epoxide finish is fast to boiling in a slightly acidic bath.

EXAMPLE 7

This example demonstrates the application of this invention to polyester fiber.

A 25,000 denier crimped tow of poly(ethylene terephthalate) fibers of 1.5 denier per filament is immersed in a dispersion made up from the following ingredients.

Emulsion A (30% silicone emulsion)

80 parts of dimethyl silicone
20 parts of methylhydrogen silicone
5.2 parts emulsifying agents:
    3.5 parts "Emcol" T-60 (Witco Chem. Co.)
    0.2 part "Emcol" P-10-59 (Witco Chem. Co.)
    1.5 parts L-77 (Union Carbide)
228.1 parts distilled water This emulsion is prepared by adding the water slowly to the other ingredients with stirring.

Emulsion B (epoxide and lead octoate emulsion)

10 parts of a 24% solution of lead octoate in hydrocarbon solvent
1 part emulsifying agents:
    0.5 part "Emcol" T-60
    0.5 part "Emcol" H-31-A
15 parts polyepoxide ("Eponite" 100, Shell Chem. Co.)
174 parts distilled water Solution C (10% solution of DMP—30 [1])

1 part DMP—30
9 parts water and acetic acid adjusted to pH of 6.5

The treating bath is prepared by adding 4730 parts water to 268 parts Emulsion A, with stirring, then adding ---
[1] Trademark of the Rohm and Haas Company for 2,4,6-tris-(dimethylaminomethyl)phenol.

18.5 parts Solution C, and finally 62.5 parts Emulsion B.

The tow is squeezed out to a wet pick-up of 48%. It is then dried and heated at 160° C. for 6 minutes to cause cross-linking of the polymers on the fiber. It is next cut into staple. The fibers are slick but are not stuck together.

The staple is blended with cotton to give 65 parts polyester to 35 parts cotton. The blend is carded and spun into a 50/1 cc. yarn with a Twist Multiple of 3.75Z. This is woven into a broadcloth fabric which after heat-setting, singeing, bleaching, scouring and drying has a soft, smooth feel being readily distinguished from a similar fabric made from fiber not treated by the present invention. This fabric is resin-treated to impart wash-wear properties. This treatment results in a slightly harsher fabric, but the fabric from fibers treated according to the present invention is less harsh than a similar fabric from fibers not treated.

EXAMPLE 8

This example demonstrates the application of this invention to the finishing of fiber spun from a polyamide made by condensing bis(4-aminocyclohexyl)methane with dodecanedioic acid.

The mixed emulsions of Example 5 are applied to a 40,000 denier tow of 3.5 denier per filament spun from a polymer made by condensing bis(4-aminocyclohexyl)methane with dodecanedioic acid according to Example 1 of British Patent 1,091,007. The treated yarn is dried and the finish cured by heating to 160° C. for ten minutes.

The resulting tow has a soft and slick feel. This finish is retained after the tow is converted to staple, yarn and fabric.

In the claims below, the term acrylic or polyacrylic textile fiber shall be understood as embracing both synthetic fibers which are polymers of not less than 85% acrylonitrile (by weight) and so-called modacrylic fibers, which are copolymers of mixtures containing not less than 35% and not more than 85% acrylonitrile.

What is claimed is:

1. A process for imparting a wash-durable, slick, soft feel to textile fibers which comprises:
   (a) coating the fibers with an aqueous finishing composition containing
      (i) liquid silicones whose molecules are made up of silicon atoms joined by one oxygen atom between each pair of neighboring silicon atoms, the sum of H and OH groups bonded to silicon on every silicone molecule being at least two, the said silicones containing on average between 5 and 60 silyl hydrogen atoms for each 100 silicon atoms, with the rest, if any of each of the four valences of each silicon atom bonded to a group independently selected from the class consisting of an alkyl radical containing from one to eight carbon atoms and an aryl radical containing from 6 to 8 carbon atoms, the said silicones having a molecular weight no less than 500, and
      (ii) soluble polyepoxides, the ratio of polyepoxides to silicones being about 0.05:1 to about 1:1 by weight,
   (b) curing the said finishing composition on said fiber.

2. The process of claim 1 wherein the liquid silicones correspond on average to the empirical formula

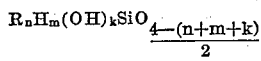

wherein R is selected from the class consisting of an alkyl radical of 1 to 8 carbon atoms, an aryl radical of 6–8 carbon atoms and mixtures thereof, wherein $n$ is a number from 1.4 to 2.0 and wherein $m$ is a number from 0.05 to 0.60 and wherein the sum of $n$ plus $m$ plus $k$ is a number from 1.9 to 2.1, and the average molecular weight of the said silicone is no less than 500, with the additional provisos that R, H, OH, and O are each, if present, bonded to silicon, and the sum of the H and OH groups on every silicone molecule is at least two.

3. The process of claim 1 wherein the liquid silicones have the formula

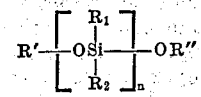

wherein
$R_1$ and $R_2$ are each independently selected for each silicon atom from the class consisting of hydrogen, an alkyl radical having from 1 to 8 carbon atoms, and an aryl radical having from 6 to 8 carbon atoms,
R′ and R″ are each independently selected from the class consisting of hydrogen and

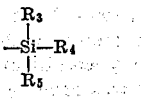

wherein
$R_3$, $R_4$ and $R_5$ are each independently selected from the group consisting of an alkyl radical having from 1 to 8 carbon atoms and an aryl radical,
$n$ is a number which will give said silicone a molecular weight of at least 500,
with the provisos that the said silicones contain an average of from 5 to 60 silyl hydrogen atoms for each 100 silicon atoms, and that no one silicone molecule has less than two hydrogen atoms as $R_1$, $R_2$, R′ and R″.

4. The process of claim 3 wherein the molecular weight of the silicones is no greater than 100,000.

5. The process of claim 4 wherein the curing is done at a temperature of from 120° C. to 170° C.

6. The process of claim 4 wherein $R_1$ and $R_2$ are each independently selected for each silicon atom from the class consisting of hydrogen, methyl and ethyl.

7. In the process of claim 3, the silicones being a mixture of at least two of the silicones defined therein, the said silicones differing in chemical composition.

8. The process of claim 4 wherein the polyepoxides contain at least one ether linkage and at least two epoxide rings within each molecule.

9. The process of claim 4 wherein the polyepoxides are selected from the group consisting of diglycidyl ether and reaction products of epichlorhydrin with a polyhydroxy compound of the group consisting of glycerol, 2,2-bis(4-hydroxyphenyl) propane, 4,4′-dihydroxy diphenyl ether, 4,4′-dihydroxy benzophenone, ethylene glycol, the propylene glycols and polyethylene oxide condensation products with polyhydroxy compounds.

10. The process of claim 9 wherein the polyepoxide is

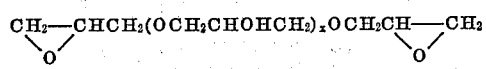

wherein $x$ is a number from 0 to 3, inclusive.

11. The process of claim 4 wherein the finishing composition additionally contains a curing catalyst.

12. The process of claim 11 wherein the catalyst is a phenol combined with a weak, volatile acid, the phenol being of the formula

wherein A is —CH$_2$— or —CH$_2$CH$_2$—, and $R_6$ and $R_7$ are independently selected from the group consisting of —CH$_3$ and —C$_2$H$_5$, and $n$ is a number from 1 to 3, inclusive, and mixtures thereof.

13. The process of claim 12 wherein the catalyst is 2,4,6-tris(dimethylaminomethyl) phenol acetate.

14. The process of claim 10 wherein the catalyst is a metal salt of an organic acid wherein said metal salt is zinc, tin or lead, and said organic acid contains at least one carboxyl group and between 2 and 20 carbon atoms per molecule.

15. The process of claim 14 wherein the catalyst is a lead salt of a monobasic aliphatic acid containing from 2 to 10 carbon atoms.

16. The process of claim 14 wherein the catalyst is a zinc salt of a monobasic aliphatic acid containing from 2 to 10 carbon atoms.

17. The process of claim 10 wherein the catalyst is selected from the group consisting of primary, secondary and tertiary amine salts of weak, volatile acids.

18. The process of claim 10 wherein the catalyst is a mixture containing a metal salt of an aliphatic acid and a member selected from the group consisting of primary, secondary and tertiary amine acetates.

19. The process of claim 4 wherein water is a carrier for the finishing composition.

20. The process of claim 4 wherein an organic solvent is a carrier for the finishing composition.

21. The process of claim 4 comprising
 (a) treating the fibers with a finishing composition comprising an aqueous dispersion of
  (i) liquid silicones comprising a mixture of predominantly hydroxy terminated dimethylpolysiloxane with a minor portion of trimethylsiloxy terminated methylhydrogenpolysiloxane, the molecular weight of which is between 1,000 and 50,000,
  (ii) a polyepoxide of the formula

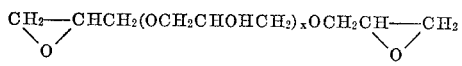

wherein $x$ is an integer from 1 to 3, inclusive, and
  (iii) a catalyst, and
 (b) curing the said treating composition on said fiber.

22. The process of claim 21 wherein the coated fibers are dried prior to curing and subsequently cured at a temperature of from 120° C. to 170° C.

23. The process of claim 22 wherein the silicone is a mixture of about 80% dimethylpolysiloxane and about 20% methylhydrogenpolysiloxane.

24. The process of claim 22 wherein the catalyst is selected from the group consisting of lead 2-ethyl hexanoate, 2,4,6-tris(dimethylaminomethyl) phenol acetate, and mixtures thereof.

25. A textile fiber having a slick, soft feel comprising a fiber in association with a cross-linked composition of liquid silicones and soluble polyepoxides, wherein the silicones are of the formula

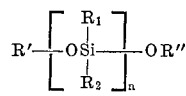

wherein $R_1$ and $R_2$ are independently selected for each silicone atom from the class consisting of hydrogen, an alkyl radical having from 1 to 8 carobn atoms and an aryl radical having from 6 to 8 carbon atoms, R' and R'' are independently selected from the class consisting of hydrogen and

where $R_3$, $R_4$ and $R_5$ are independently selected from the group consisting of an alkyl radical having from 1 to 8 carbon atoms and an aryl radical, and $n$ is a number which will give said silicone a molecule weight from 500 to 100,000, with the provisos that the said silicones contain an average of from 5 to 60 silyl hydrogen atoms for each 100 silicon atoms, and that no one silicone molecule has less than two hydrogen atoms as $R_1$, $R_2$, R' and R'',
 the ratio of said polyepoxides to said silicones being from 0.05:1 to 1:1 by weight.

26. The textile fiber of claim 25 where the said fiber is selected from the group consisting of acrylic fibers, polyester fibers, polyamide fibers, and mixtures thereof.

References Cited

UNITED STATES PATENTS

| | | | |
|---|---|---|---|
| 2,469,888 | 5/1949 | Patnode | 260—448.2 |
| 2,588,365 | 3/1952 | Dennett | 117—161 |
| 2,597,614 | 5/1952 | Brown et al. | 117—121 |
| 2,645,629 | 7/1953 | Nitzche et al. | 117—161 X |
| 2,872,428 | 2/1959 | Schroeder | 117—161 X |
| 3,055,774 | 9/1962 | Gilkey et al. | |
| 3,055,858 | 9/1962 | Frye et al. | |
| 3,076,726 | 2/1963 | Ault. | |
| 3,108,356 | 10/1963 | Lincoln | 117—139.5 X |
| 3,167,448 | 1/1965 | Hirshfeld | 117—138.8 |

WILLIAM D. MARTIN, Primary Examiner

THEODORE G. DAVIS, Assistant Examiner

U.S. Cl. X.R.

117—139.5, 161